US009480314B2

(12) United States Patent
Heim (10) Patent No.: US 9,480,314 B2
(45) Date of Patent: Nov. 1, 2016

(54) LENGTH-ADJUSTABLE TUBE, IN PARTICULAR FOR STICKS

(71) Applicant: LEKISPORT AG, Baar (CH)

(72) Inventor: Eberhard Heim, Unterensingen (DE)

(73) Assignee: LEKISPORT AG, Baar (CH)

( * ) Notice: Subject to any disclaimer, the term of this patent is extended or adjusted under 35 U.S.C. 154(b) by 0 days.

(21) Appl. No.: 14/409,632

(22) PCT Filed: Jun. 19, 2013

(86) PCT No.: PCT/EP2013/062692
§ 371 (c)(1),
(2) Date: Dec. 19, 2014

(87) PCT Pub. No.: WO2014/012730
PCT Pub. Date: Jan. 23, 2014

(65) Prior Publication Data
US 2015/0320159 A1 Nov. 12, 2015

(30) Foreign Application Priority Data

Jul. 19, 2012 (CH) ...................................... 1096/12

(51) Int. Cl.
*A45B 3/12* (2006.01)
*A63C 11/22* (2006.01)
(Continued)

(52) U.S. Cl.
CPC . *A45B 9/00* (2013.01); *A45B 3/12* (2013.01); *A63C 11/221* (2013.01); *F16B 7/1463* (2013.01); *A45B 2009/007* (2013.01)

(58) Field of Classification Search
CPC .............. A45B 3/12; A45B 2009/007; A45B 220/055; A45B 9/00; A45B 220/055; F16B 7/10; F16B 7/14; F16B 7/1463; Y10T 403/7064; Y10T 403/3267; Y10T 403/32467; A63C 11/221
USPC ...... 135/65, 75, 141–142; 248/188.5, 125.8; 403/109.1, 109.5, 109.7, 374.1, 374.3; 280/819, 823
See application file for complete search history.

(56) References Cited

U.S. PATENT DOCUMENTS 2,947,556 A * 8/1960 Wenger ................. F16B 7/1463
108/147.19
3,004,743 A * 10/1961 Wenger ................. F16B 7/1445
248/161
(Continued)

FOREIGN PATENT DOCUMENTS

DE 42 05 445 A1 8/1993
DE 297 06 849 U1 9/1998
(Continued)

OTHER PUBLICATIONS

International Preliminary Report on Patentability dated Jan. 29, 2015, issued by the International Bureau of WIPO in counterpart Application No. PCT/EP2013/062692.
(Continued)

*Primary Examiner* — Winnie Yip
(74) *Attorney, Agent, or Firm* — Sughrue Mion, PLLC (57) ABSTRACT

A length-adjustable tube for trekking sticks etc, comprising an outer tube and an inner tube insertable telescopically into the outer tube, and an expanding device with which the inner tube is clampable in the outer tube. The expanding device has an expanding element which can be pushed apart radially and is provided with a taper, and an inner element which is provided with an opposed taper and is accommodated in the expanding element. An adjustment screw held on the inner tube is operatively connected to an internally threaded bore in the inner element A clamping section is arranged on the expanding element, which, in a relaxed state, has a greater radius than the radius of the expanding element. The clamping section is elastically offsettable inwards counter to a restoring force.

24 Claims, 6 Drawing Sheets

(51) Int. Cl.
    *A45B 9/00*    (2006.01)
    *F16B 7/14*    (2006.01)

(56) References Cited

U.S. PATENT DOCUMENTS

| | | | | |
|---|---|---|---|---|
| 4,858,926 A | * | 8/1989 | Cabianca | A63D 15/086 |
| | | | | 403/109.5 |
| 5,458,427 A | * | 10/1995 | Simond | A63C 11/221 |
| | | | | 280/820 |
| 5,897,268 A | * | 4/1999 | Deville | F16B 7/1463 |
| | | | | 403/109.1 |
| 6,027,087 A | | 2/2000 | Lindemann et al. | |
| 6,250,839 B1 | * | 6/2001 | Lenhart | A63C 11/221 |
| | | | | 135/75 |
| 6,745,909 B1 | * | 6/2004 | Lai | A47G 25/0664 |
| | | | | 211/204 |
| 7,007,909 B2 | * | 3/2006 | Hsieh | F16B 7/1463 |
| | | | | 248/412 |
| 8,215,863 B2 | * | 7/2012 | Sohn | A45B 9/00 |
| | | | | 135/75 |
| 8,297,870 B2 | * | 10/2012 | Lenhart | A45B 9/00 |
| | | | | 135/75 |
| 8,960,456 B2 | * | 2/2015 | Didehvar | A47K 3/38 |
| | | | | 211/105.4 |
| 2006/0204322 A1 | * | 9/2006 | Roiser | A45B 9/00 |
| | | | | 403/109.5 |
| 2010/0040406 A1 | | 2/2010 | Lenhart | |

FOREIGN PATENT DOCUMENTS

| | | |
|---|---|---|
| DE | 297 08 829 U1 | 10/1998 |
| WO | 03/095041 A1 | 11/2003 |

OTHER PUBLICATIONS

International Search Report of PCT/EP2013/062692 dated Sep. 18, 2013.

* cited by examiner

LENGTH-ADJUSTABLE TUBE, IN PARTICULAR FOR STICKS

CROSS REFERENCE TO RELATED APPLICATIONS

This is a National Stage of International Application No. PCT/EP2013/062692 filed Jun. 19, 2013, claiming priority based on Swiss Patent Application No. 01096/12 filed Jul. 19, 2012, the contents of all of which are incorporated herein by reference in their entirety.

TECHNICAL SCOPE

The present invention relates to a length-adjustable tube, in particular for sticks.

PRIOR ART

In the case of a length-adjustable tube known from DE 297 06 849 U1, the expanding element is provided with a tapering female cone toward the inner tube, whilst the opposite inner element which is provided with the male cone is adjusted toward the inner tube for clamping the expanding device with the adjustment screw. In this way, relatively parallel clamping is certainly produced over the entire axial length of the expanding element, however it has been shown that in the case of impact loads from the handle side of a length-adjustable stick onto the stick tip, axial displacement of the outer tube in relation to the inner tube is not always able to be avoided, especially when insufficiently high force has been applied for clamping in the case of a twisting movement.

DE 297 08 829 U1, over and above this, makes known a length-adjustable tube where the inner element which is provided with the male cone is formed by the front free end of the adjustment screw and the expanding element which is provided with the female cone is moved axially along the adjustment screw. In this connection, the female cone of the expanding element is certainly open toward the inner tube, however the same aforementioned disadvantages are produced here when the expanding element is fixed axially in the expanded state. Here too, there can be relative movement between the outer tube and the expanding element.

To a certain extent, the problems of the abovementioned expanding mechanisms are solved by EP-A-1450906 which provides a design where the female cone of the expanding element extends in such a manner that it opens toward the inner tube, and that the expanding element is held so as to be movable axially within certain limits between an inner stop on the inner tube and an outer stop on the free end of the adjustment screw. Thus, the mechanism is clamped automatically under load using a surprisingly simple design. However, the problem here, as also in the case of the abovementioned designs, is that where the mechanism is triggered in an overly strong manner, the situation can occur that, because the expanding element has insufficient friction on the inner wall of the outer tube, said outer tube, where an attempt is made to tighten the mechanism, is rotatingly entrained with the entire expanding device (including the clamping wedge and the adjustment screw) when the inner tube is rotated relative to the outer tube and thus the mechanism is not able to be tightened. It is only possible to solve this problem by laboriously pulling the two tubes almost completely apart, lightly tightening the mechanism and then pushing the tubes together again. The invention is to create a remedy for this situation.

REPRESENTATION OF THE INVENTION

It is correspondingly, among other things, the object of the present invention, to provide an improved expanding device for length-adjustable tubes, in particular for sticks such as ski poles, trekking poles, cross-country poles and Nordic walking poles, said length-adjustable tube having at least one outer tube and one inner tube which is telescopically insertable into the outer tube for adjusting the tube length. In this case, in such a design there is preferably an expanding device, which is held at the insertion end of the inner tube and by way of which the inner tube is axially clampable in the outer tube (frictional locking with friction between the expanding element and the inner wall of the outer tube) and which comprises an expanding element, which can be pushed apart radially and is provided with a female cone, and an inner element, which is provided with an opposite male cone and is accommodated in an axially displaceable manner in the expanding element, and an axially directed adjustment screw which is held non-rotatably on the inner tube and is in operative connection with an internally threaded bore in the inner element. In this case, the expanding element has a thread-free passage opening through which the adjustment screw passes. In other words, there is no direct interaction between the adjustment screw and the expanding element, it being possible to displace the latter within the framework of a defined axial play along the adjustment screw in the axial direction without rotating the expanding element.

Such a design is now characterized in particular in a preferred Manner in that a clamping portion, which, in the radial direction at least in the region of a contact surface, has a greater radius in the relaxed state than the radius of the expanding element in its expanding region which is brought about as a result of the interaction with the inner element, is arranged on or in the expanding element. The expanding region in this case is that region of the expanding element which is not only expanded but which in this case also comes into contact with the inner surface of the outer tube by way of its outer surface and in a corresponding manner ensures the actual axial clamping action between the two tubes. In addition, said clamping portion can be offset or displaced inward at least in the region of the contact surface in an elastic manner against a resetting force toward the axis of the expanding element at least as far as up to the radius of the expanding element.

The radius of the clamping portion in the relaxed state, in this case, is chosen such that it is precisely somewhat greater than the inner radius of the outer tube. The result here is that irrespective of the clamping state of the expanding device, that means irrespective of in which axial position the inner element lies relative to the expanding element, said clamping portion is always in abutment with the inner wall of the outer tube. There is therefore always, and independently of the clamping state of the expanding device, contact between the clamping portion and the inner wall, and this leads, as a result of said contact, to there being sufficient friction present such that when the inner tube is rotated relative to the outer tube, the expanding element is fixed rotationally with reference to the outer tube and therefore cannot simply entrain in rotation the entire expanding device and cannot allow itself to be tightened. Said structural measure which is simple per se has an excellent effect for it results in precisely the abovementioned problems being completely solved, namely that when the device is triggered in an overly strong manner, it is no longer possible to fix it again without laborious manipulations.

A first preferred embodiment of said device is characterized in that, in its axial region which faces the inner tube, the expanding element has a cylindrical portion which is only expanded a little or is substantially not expanded by the inner tube, and that the clamping portion is arranged in said cylindrical portion. In said region of the cylindrical portion, the expanding element can also be expanded to a certain extent (in particular when there is an axial gap that extends over the entire length of the expanding element), but said expansion, on account of the smaller outer diameter in said region, as a rule does not contribute, or only contributes negligibly to the clamping effect. Obviously, the clamping portion can also be arranged in the expanding region, i.e. in that region where also as a result of the interaction with the inner element, the outer element is expanded in a clamping manner against the inner wall of the outer tube, however it has proved to be structurally simple and more reliable with regard to the method of operation when the clamping portion is arranged in such an axial region which is not directly connected to the actual axial clamping action of the device.

Said cylindrical portion preferably forms that region of the expanding sleeve which is facing the inner tube, and the actual expanding portion (that is that region in which the expanding element is expanded by the inner element and pressed against the inner wall of the outer tube when the mechanism is tightened) forms that region which lies on the side of the free end of the adjustment screw. In a preferred manner, the cylindrical portion is also realized in a cylindrical manner just as the expanding portion, but has a smaller outer diameter than the expanding portion. In other words, on the outer contour there is a preferred circumferential step in the form of a tapering between the expanding portion and said cylindrical portion. Said tapering, in a preferred manner, is pronounced differently depending on the outer diameter of the expanding element. Where an outer diameter of the expanding element is 15 mm (in each case the outer diameter in the clamping portion corresponds to the inner diameter of the outer tube), for example said step is 0.5-1.5 mm (difference in radius) on each side, where an outside diameter of the expanding element is 14 mm, the step is 0.2-1 mm (difference in radius) on each side, and where an outside diameter of the expanding element is 12 mm, it is only very small, such as, for example, 0.1-0.5 mm (difference in radius).

The cylindrical portion, in a preferred manner, is less long in the axial direction than the expanding portion. Typically, the maximum length of the cylindrical portion is the same length as the expanding portion, preferably however it is quarter to half as long as the expanding portion. In other words, in a preferred manner the expanding element is developed such that it is formed initially on its side facing the inner tube by the cylindrical portion, with reference to the entire length of the expanding element over an axial length of 10-50%, preferably over an axial length within the range of 20-30% of the overall length of the expanding element, and the expanding portion then follows over the remaining length of the overall length of the expanding element, the expanding portion also forms, in other words, the upper closure of the expanding element.

Such a design can be realized in a particularly simple and structurally reliable manner by the clamping portion being developed in the form of at least one tab which is realized by two axially extending slots separate from the cylindrical portion and which is connected at least on one side to the cylindrical portion by means of an arm which acts as an elastic link to the cylindrical portion. It is quite especially preferred when there is such an arm only on one side, and this means that the tab comprises a free end which faces the inner tube, and in said region preferably provides a conically extending contact surface which is directed radially outward and is preferably adapted to the inside surface of the outer tube. The arm then acts to some extent as an elastic spring member.

In a preferred manner at least two clamping portions are arranged on the expanding element, in a particularly preferred manner in the above-named cylindrical portion of the expanding element, preferably in an oppositely situated manner or rather, in the case of more than two, in a manner distributed equally around the circumference. In a particularly preferred manner, there are two oppositely situated clamping portions in said cylindrical region such that as symmetrical a bracing as possible is ensured in the outer tube.

Typically, it has been proven as sufficient, in particular in connection with the realization of the expanding element from plastics material such as, for example, polyethylene, polyamide, polycarbonate or a similar, where applicable, fiber-reinforced realization, when the greater radius of the clamping portion is at least 1%, preferably at least 2%, in particular in a preferred manner within the range of 3-8% greater than the radius of the expanding element in the relaxed state. The measurement for said extra amount depends, on the one hand, on the tolerance of the inner diameter, on the other hand, however, also on the strength of the elastic resetting force which is provided by the clamping portion. This latter is determined, for example, in the case of integral realization with the entire expanding element by the thickness and the width of the arm as well as the choice of material used. The clamping as a result of said elastic action of the clamping portion has to be precisely large enough such that in the released state the expanding element can be prevented from being entrained in rotation with the inner tube, but must not, however, be so large that in the relaxed state it prevents the axial displacement of the two tubes relative to one another. In a preferred manner, as already mentioned further above, the clamping portion is realized integrally with the expanding element, and is particularly simple because the expanding element is able to be realized from a plastics material in one single injection molding operation and can be placed to some extent on existing clamping wedges (repowering/upgrading).

As a further improvement of the problems with the expanding device being fully triggered, it is possible for a projection which extends in each case in the axial direction to be arranged on the stop surface of the inner tube which faces the expanding device and/or on the inner element on its stop surface which faces the inner tube. It is namely such that when the inner element is rotated too strongly toward the inner tube, which is possible in particular when the expanding element is fixed particularly well with reference to the outer tube as a result of the named clamping portions, the inner element, as a result of wide-area abutment against the stop on the inner tube, jams relative to said latter and can no longer be triggered without completely disassembling the clamping mechanism. This can be extensively avoided by said projections, which are arranged either on the inner element or on the inner tube, or in a preferred manner on both elements, as wide-area abutment with a large amount of friction is no longer possible, only spot abutment now being possible.

A particularly preferred method of construction of such projections is characterized in that the respective projection is realized in the form of a ramp, which is built up in the circumferential direction in a gradually contoured or linear or even stepped manner and ends in a preferred manner in an axial stop surface (step, plane parallel to the axis). In a preferred manner, such a ramp has typically an axial height within the range of 0.1-3 mm, preferably within the range of 0.2-1 mm.

It is quite especially preferred when such projections are arranged on both the inner tube and on the inner element, and they are realized working in opposite directions relative to one another in such a manner that the two axial stop surfaces, when turning down the inner element with respect to the inner tube, can be can be moved into a wide-area abutment position.

A further preferred embodiment is characterized in that the female cone of the expanding element extends in such a manner that it opens toward the inner tube, and that the expanding element is held so as to be movable axially within certain limits between an inner stop on the inner tube and an outer stop, preferably on the free end of the adjustment screw, wherein said axial play is preferably within the range of 0.1-5 mm, in particular preferably within the range of 0.25-2.5 mm.

The expanding element, in this case, can be realized in a cup-like manner and the cup bottom is penetrated by the free end region of the adjustment screw, which is remote from the inner tube, through the thread-free passage opening, wherein the outer stop is preferably formed by a cap which is placed onto the free end of the adjustment screw once the expanding element has been placed in position and is fastened axially or by a screw head which is arranged there.

The expanding element can additionally be provided in a circumferential region with a slot which extends over the entire axial length, as well as preferably, in addition, with a slot which is located on the opposite circumference and extends substantially up to a cylindrical portion of the expanding element which faces the inner tube and extends through said expanding element, wherein in a preferred manner the inner element which is provided with the male cone comprises one or more wings which extend radially and axially and which is or are also guided in axial slots of the expanding element.

The expanding device can additionally comprise a plug which receives the adjustment screw in an axial and non-rotatable manner and is preferably held in the inner tube in an axial and non-rotatable manner, preferably up to a circumferential flange and which forms the inner stop.

Last but not least, the present invention relates to a ski pole, trekking pole, cross-country pole or Nordic walking pole having a length-adjustable tube as described above, wherein, where applicable, it is also possible to provide more than only one adjustment range, and further adjustment ranges can be realized either with an expanding device as described above or with another expanding device which, where applicable, is also located outside, and wherein a handle is arranged on the topmost outer tube and a pole tip on the bottommost inner tube.

Further embodiments are provided in the dependent claims.

BRIEF DESCRIPTION OF THE DRAWINGS

Preferred embodiments of the invention are described below by way of the drawings which serve purely for explanation and are not to be seen as limiting, in which drawings.

DESCRIPTION OF PREFERRED EMBODIMENTS

Figure 1:
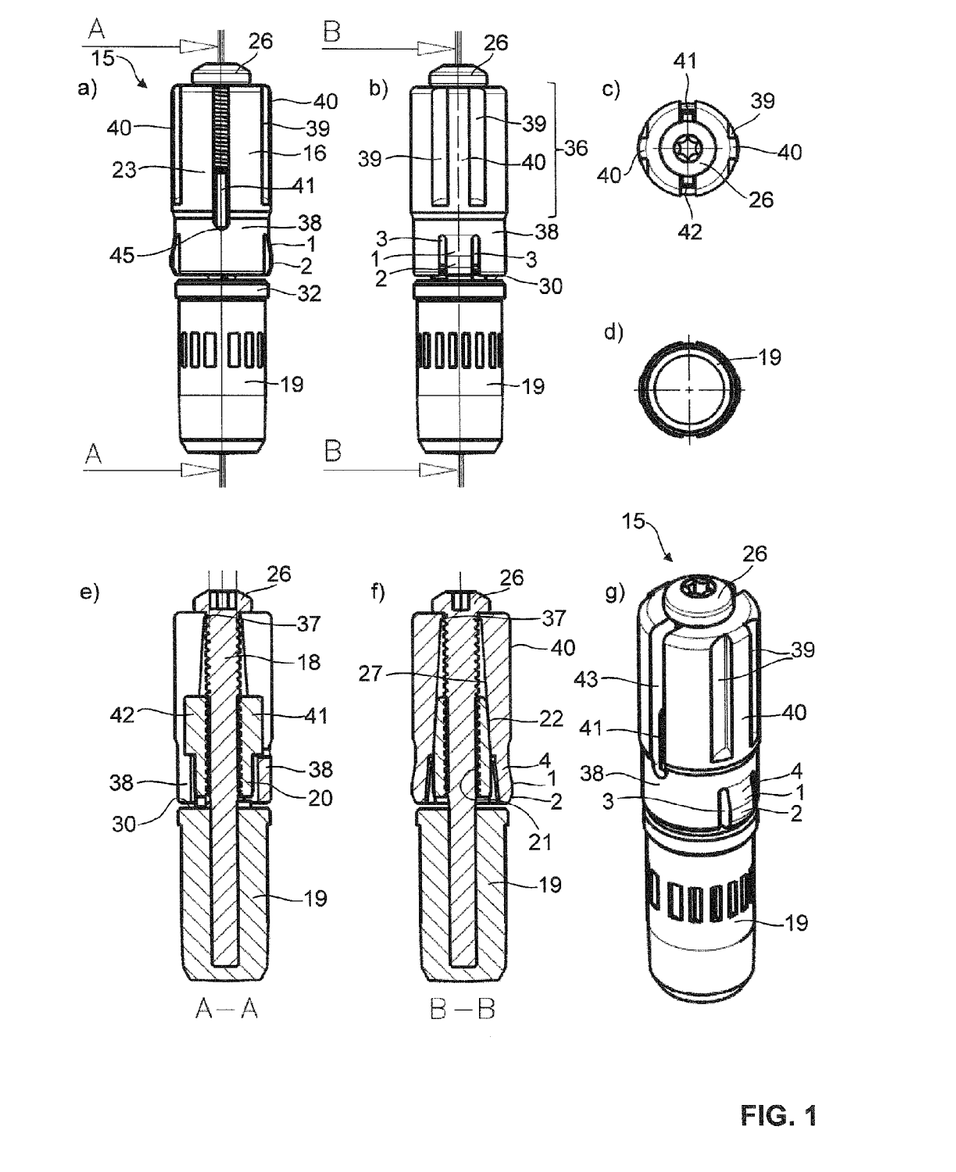
FIG. 1 shows different views of the expanding device without an inner tube and outer tube, wherein in a) a first side view, and in b) a side view rotated by 90° is shown, in c) a top view from above, in d) a view from below, in e) an axial section according to A-A in figure a), in f) an axial section according to B-B in figure b) and in g) a perspective view.
Figure 2:
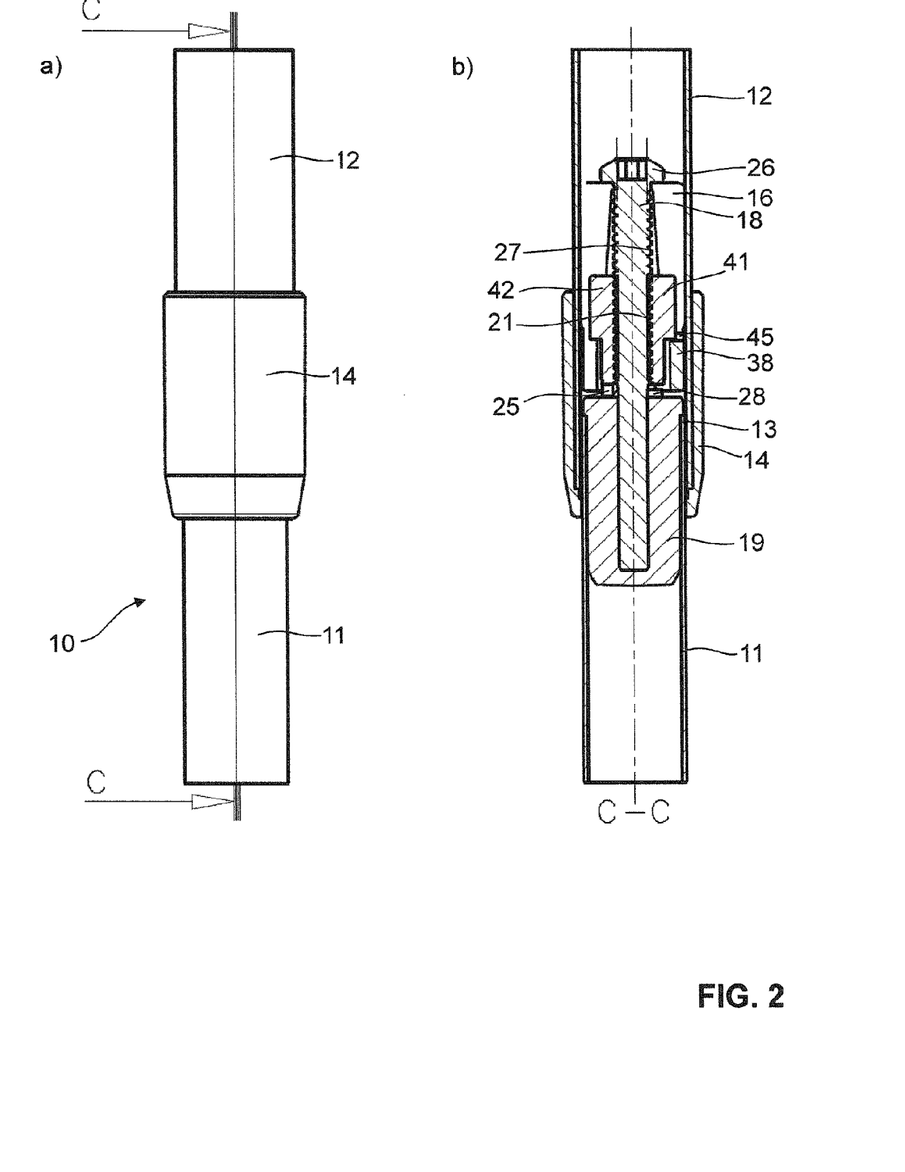
FIG. 2 shows a tube portion with an expanding device at the transition from the inner tube to the outer tube, wherein in a) a side outside view and in b) the section according to C-C in a) is shown.
Figure 3:
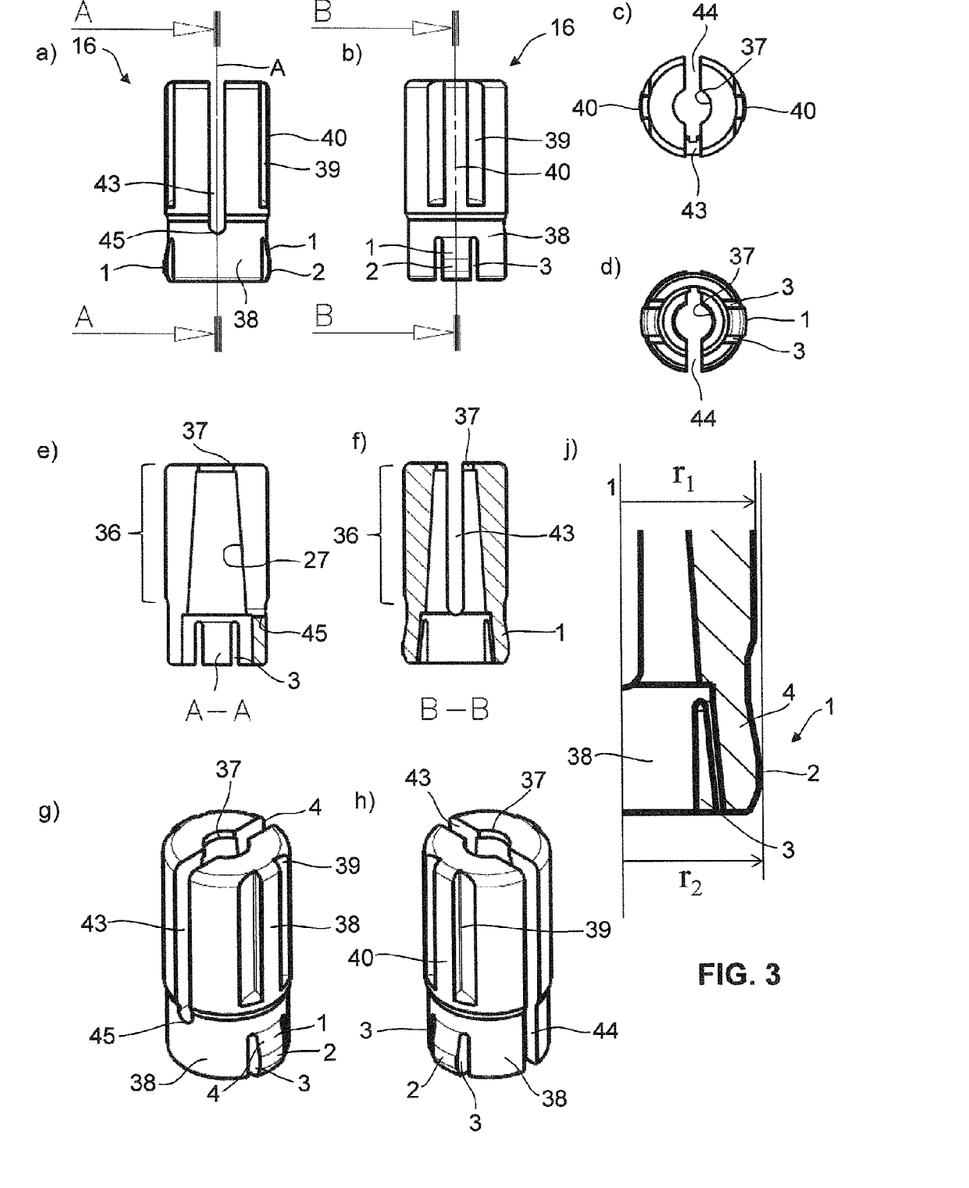
FIG. 3 shows different views of just the expanding element, wherein in a) a first side view, and in b) a side view rotated by 90° is shown, in c) a top view from above, in d) a view from below, in e) an axial section according to A-A in figure a), in f) an axial section according to B-B in figure b) and in g) and h) two perspective views rotated by 90° are shown.
Figure 4:
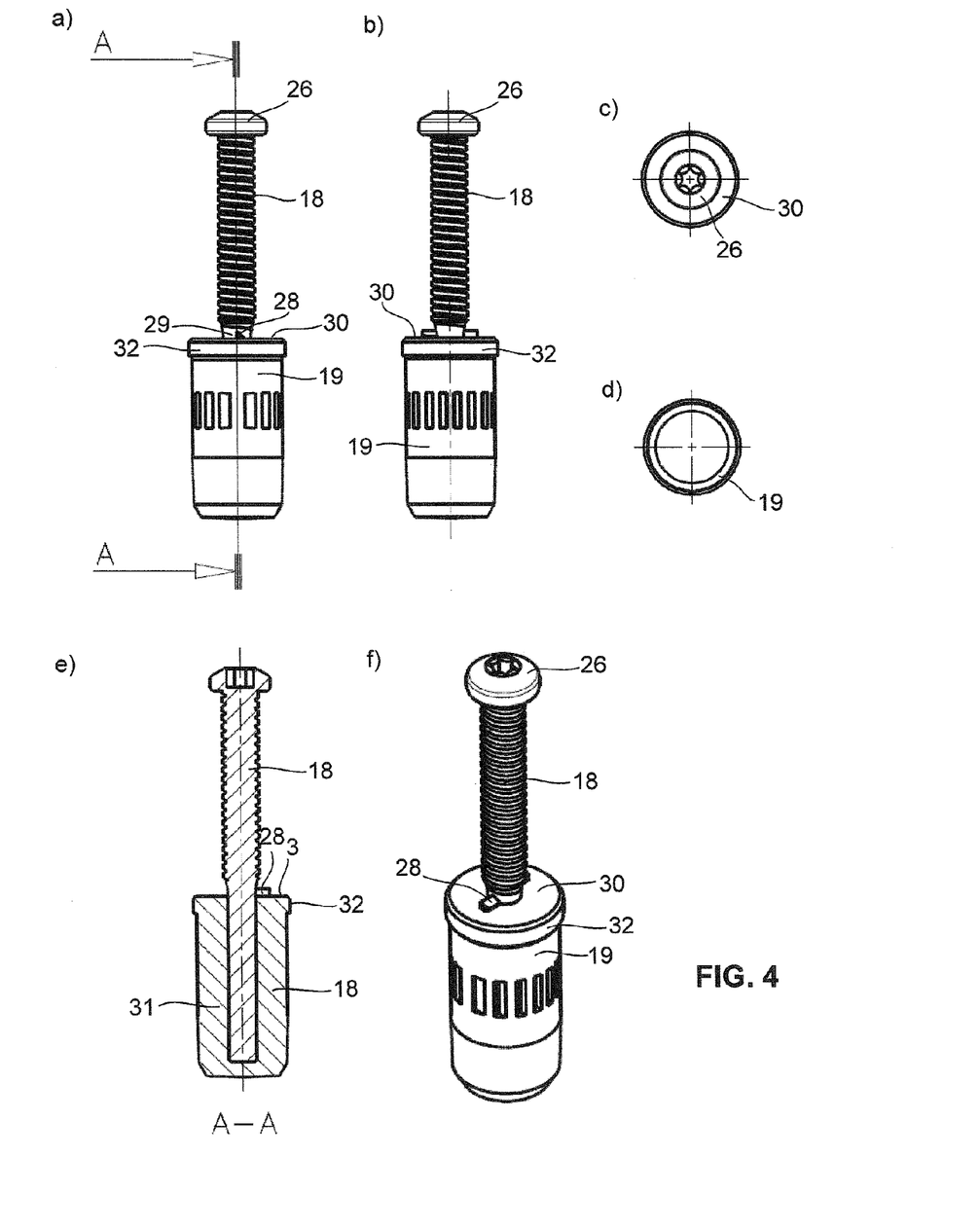
FIG. 4 shows different views of the end plug with the positionally fixed adjustment screw without a clamping wedge and expanding element placed in position, wherein in a) a first side view, and in b) a side view rotated by 90° is shown, in c) a top view from above, in d) a view from below, in e) an axial section according to A-A in figure a), and in f) a perspective view.
Figure 5:
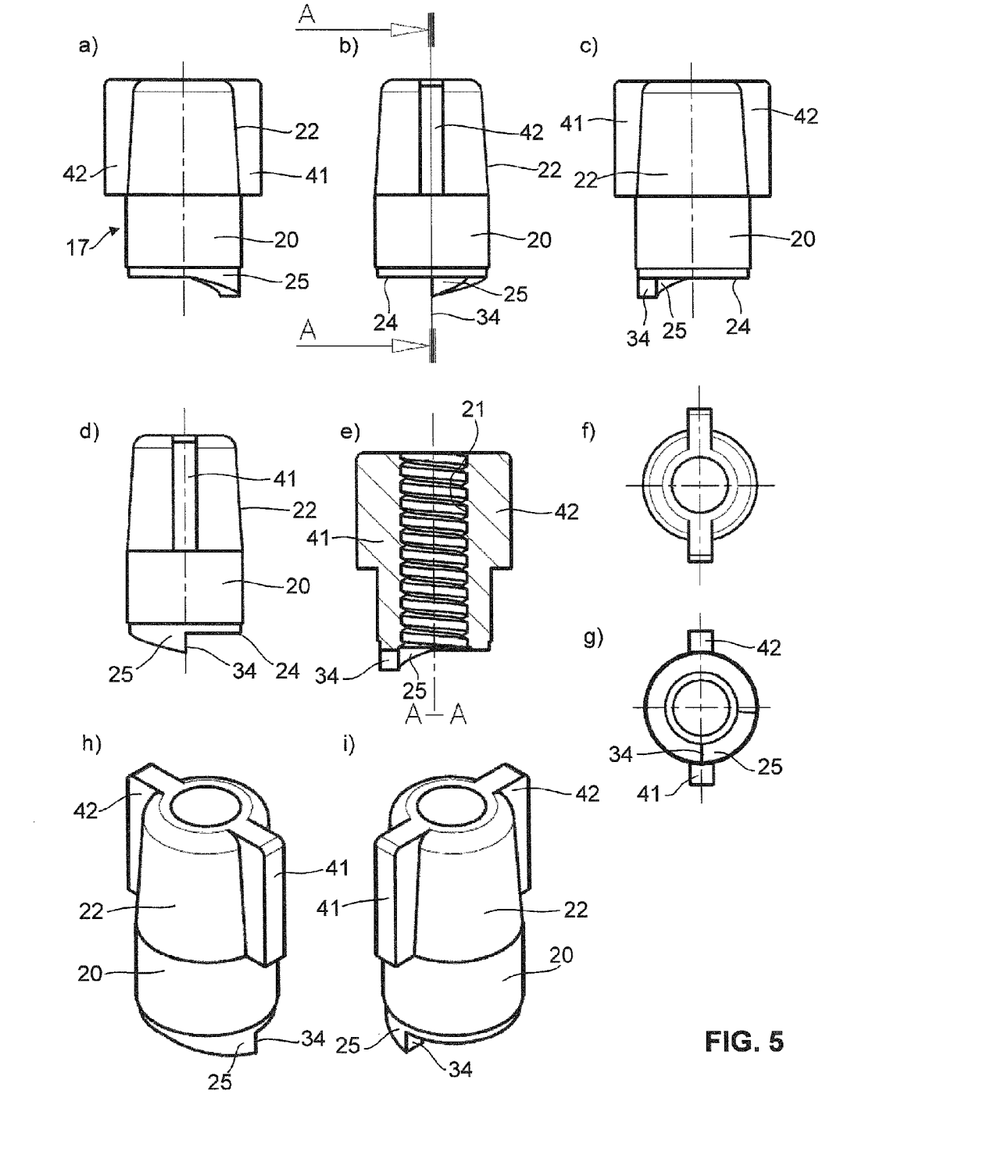
FIG. 5 shows different views of just the clamping wedge, wherein in a) a first side view, in b) a side view rotated by 90°, in c) a side view rotated by a further 90°, in d) a side view rotated by yet a further 90° is shown, in e) an axial section according to A-A in figure b), in f) a top view from above, in g) a view from below, in h) and i) two perspective views rotated by 90° are shown (the representations in FIGS. 1-4 are enlarged but are to scale relative to one another but in this respect no perspective representations are chosen, and the representation in FIG. 5 is given in a scale of 2:1 which is larger compared to FIGS. 1-4 for the purposes of better illustration)
Figure 6:
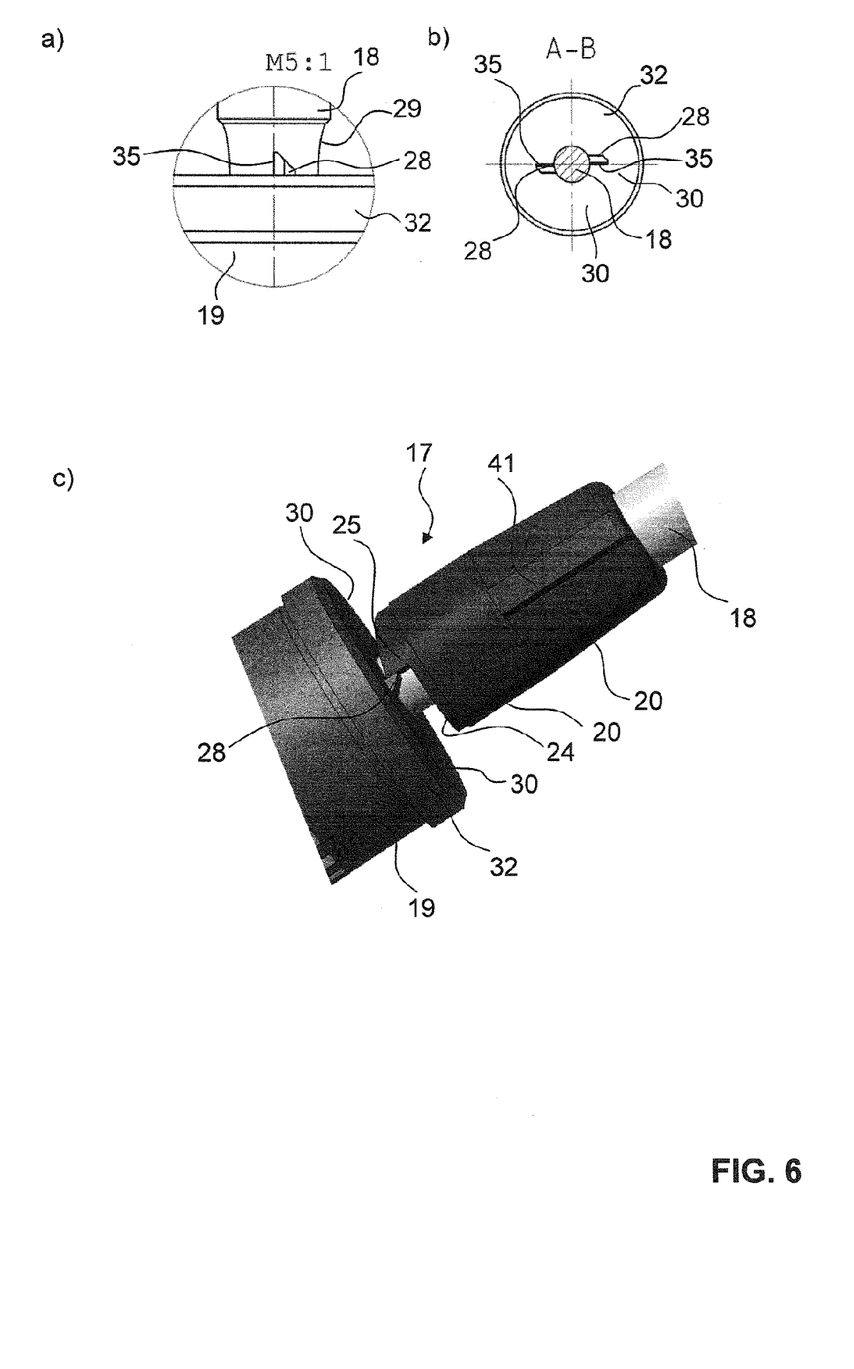
FIG. 6 shows views of details of the foot region of the adjustment screw in a) in a side view in an enlarged cutout corresponding to FIG. 4 a) and in a sectioned view through the foot region of the adjustment screw in b), as well as a perspective view of the clamping wedge with the two ramps in the abutment situation on the collar or rather the clamping wedge.

An exemplary embodiment of a clamping mechanism according to the invention is shown in FIGS. 1-5 discussed below, FIG. 1 showing the clamping mechanism without tubes for better illustration, FIG. 2 showing the clamping mechanism with an outer tube and inner tube, FIG. 3 showing only the expanding element, FIG. 4 showing only the end plug with the adjustment screw and FIG. 5 showing only the inner element or rather the clamping wedge. FIG. 6 shows details of the mechanism for the explanation thereof. In this case, references provided in the different figures designate in each case the identical structural features.

In the case of the connecting portions of a length-adjustable tube 10 shown in the figures, in particular in FIG. 2, an inner tube 11 is guided in the manner of a telescope in an outer tube 12. To this end, the inner tube 11 is provided at its end 13 that faces the outer tube 12 with an expanding device 15, by means of which the inner tube 11 is securable in an arbitrary position in the outer tube 12. The outer tube 12 has on its end that faces the inner tube 11 a circumferential plastics material sleeve 14, into which the outer tube is pressed and/or bonded. Said optional sleeve contributes to better guiding of the inner tube (the sleeve 14 actually also engages around the inner tube in the region projecting beyond the outer tube over the entire circumference), it leads to improved manageability and prevents, for example, skin getting caught between the two tube portions during the adjusting operation, and in general it reduces the risk of injury on the sharp edges of the aluminum tubes used. Such a sleeve is typically produced from plastics material, for example polyethylene, polycarbonate, polyamide or compounds thereof or rather two-component methods of construction thereof. However, the sleeve can also consist of metal for, among other things, esthetic reasons.

The expanding device 15 has an outer element in the form of an expanding element 16, an inner element 17, also designated as a clamping wedge, and an adjustment screw or externally threaded rod 18 which typically consists of metal, however it can also be produced from plastics material.

The externally threaded rod 18, which is arranged in the axial direction of the tube 10, is held non-rotatably by way of its one end region on the insertion end 13 of the inner tube 11. To this end, the externally threaded rod 18 is inserted into an end plug 19, screw-connected or integrally molded thereon or the like and is axially fixed and non-rotatably held in said end plug as a result of bonding or the like. The end plug 19 is also axially fixed and non-rotatably held in the inner tube 11. Typically, the end plug 19 has an insertion region which lies completely in the inner tube 11, as well as a circumferential flange, the outer diameter of which corresponds to the outer diameter of the inner tube 11, and which serves as a stop for the inner tube 11 when said inner tube is pushed onto the end plug 19 and is connected fixedly to said end plug either as a result of frictional locking and/or an adhesive bond and/or positive locking.

The inner element 17 is screw-connected to the externally threaded rod 18 by way of its axial central internal thread 21. The inner element 17 is provided on the outside with a cone 22 or is realized in a tapered manner.

The outer cone 22 tapers toward the free end of the externally threaded rod 18. The externally threaded rod 18 penetrates the internally threaded bore 21 of the inner element 17 and is connected non-rotatably to an outer stop 26 at its protruding free end. The outer stop 26 is typically formed by a screw head 26. If the expanding element is realized namely by way of a continuous slot, such a device can be assembled in a simple manner, by, when using an adjustment screw 18 with a screw head 26, the inner element 17 being screw-connected to the screw 18 in a first step, then the adjustment screw 18 being screw-connected into the end plug, and subsequently the expanding element, widened by the continuous slot 44, being pushed on sideways.

The outside expanding element 16, on its expandable main body 23 in the region 36, has a female cone or female taper 27, the steepness of which corresponds to that of the male cone or taper 22 of the inner element 17. According to the representation in the drawing, the inner element 17 is received in a substantially play-free manner in the opposed expanding element 16, the male cone 22 of the clamping wedge being shorter than the female cone 27 of the expanding element. Corresponding to the arrangement shown, the female cone or female taper 27 of the expanding element 16 opens toward the inner tube 11. For example, the expanding element 16 can be produced from a plastics material and the inner element, 17 from a metal or plastics material.

As can be seen in particular from FIG. 3, which shows the expanding element 16, said expanding element has an actual expanding region 36, this means the region of the expandable main body 23, where the conically tapering region 27 is arranged in the interior and, as a result of interaction with the inner element 17, the actual expanding is effected when the inner element penetrates into the outer element 16. Below, that means in the region connecting in the direction of the inner tube 11, the expanding element has a cylindrical region 38 which, unlike the region 36, does not come into contact with the inner will of the outer tube 12 in the clamping state either. In said region 38, there is now a clamping portion 1 which is realized in the form of an elastic tongue which is directed to the inner tube 11 and has a free end. Said portion 1 is formed to some extent from the region 38 by two slots 3 which extend axially offset around the circumference and pass through the axial region. 38 from the side that faces the inner tube in part, preferably approximately by $\frac{2}{3}$-$\frac{3}{4}$. Thus, a clamping portion 1 is formed which, as it is realized integrally with the rest of the expanding element 16, is realized in the manner of a spring element or a leaf spring. As during the injection molding method, said element 1 is realized with its free end protruding radially outward, a contact zone 2 is formed in the region of the free end. The clamping element 1 contacts the inner wall of the outer tube 12 in said contact zone 2 as a result of the fact that the radius r2 (in the relaxed state) is greater than the radius r1 in the clamping region 36 of the expanding element (in the relaxed state) and also precisely somewhat greater than the inner diameter of the outer tube 12 irrespective of the clamping state of the mechanism. In order to ensure as good a clamping action as possible in the region 2, said region is realized with the same circumferential curvature as the inner curvature of the outer tube 12. In the axial direction, the contact region 2 can be realized either in a straight manner or in a slightly concave manner in order to react to different inner radii of the outer tubes.

In this case, when viewed around the circumference, there are two such oppositely situated clamping portions 1 such that symmetrical clamping is ensured.

The integral end plug 19 is provided with an inner part 31, which is held non-rotatably and non-displaceably in the inner tube 11, and with a collar or circumferential flange 32 which rests on the ring end face of the inner tube 11.

The expanding element 16 is somewhat cup-shaped, the cup bottom 36 having a passage opening 37 which is penetrated by the free end region of the adjustment screw 18, and not comprising any thread. The cup bottom 36 is movable axially without rotation relative to the adjustment screw 18. The main body 23 of the expanding element 16, which is provided on the outside of the circumference with one or several friction linings, coated or the like or can be realized in such a manner as a result of its surface development (for example longitudinal ribs 40 and parallel indentations 39 lying next to them) in order to achieve an increased frictional force in relation to the inner circumference of the outer tube 12, on its end remote from the cup bottom 36 and facing the inner tube 11, has a cylindrical shoulder 38 with a smaller outer diameter which has already been discussed above. The expanding element 16 is preferably situated consequently so as to be axially movable within certain limits between the outer stop 26 on the free end of the adjustment screw 18 and an inner stop surface 28. The spacing between the two stop surfaces 24 and 28 is somewhat greater than the axial length of the expanding element 16 between the outer surface of the cup bottom 36 and the ring end face of the cylindrical shoulder 38.

As an alternative to this, however, the outer stop can also be provided, for example, by a circumferential flange, on the adjustment screw which is provided specifically for that purpose and a corresponding rib on the expanding element, and the same applies to the inner stop, said inner stop not necessarily having to lie on the end plug 19. The important factor for such an embodiment is that the expanding element 16, during the fixing operation, is displaced in the direction of the free end of the adjustment screw onto a stop, and that once said position is reached, the expanding element comprises a certain well-defined play toward the inner tube such that in the case of a load, i.e. a relative displacement of the two tubes toward one another, the expanding element is pushed even further onto the inner element, the two conical surfaces are pushed further toward one another and the clamping mechanism is secured even further.

In two circumferential regions of the outer tube 22 which are situated diametrically opposite one another, the inner element 17 has in each case a wing 41, 42, the longitudinally extending end face of which runs parallel to the axis of the pole. Each wing 41, 42 is guided axially in a correspondingly wide slot 43, 44 of the expanding element 16. In this way, the inner element 17 when moving axially relative to the expanding element 16 is non-rotatable in relation to said expanding element. The two slots 43, 44 are provided substantially over the longitudinal extension of the main body 23 of the expanding element 16, i.e. only extend marginally into the region of the cylindrical shoulder 38. This also means in other words that the largest radial dimension of the wings 41 and 42 which are located diametrically opposite one another is somewhat greater than the inner diameter of the cylindrical shoulder 38.

The expanding element 16 is provided on its outer circumference with four incisions 40 which are arranged in each case in an axially-symmetrical or point-symmetrical manner with respect to one another, run in the longitudinal direction and extend over almost the entire length of the main body 23 of the expanding element 16. Defined circumferential clamping regions of the expanding element 16 are produced as a result.

In order to move the expanding element 16 (if it has not been threaded in first) subsequently over the adjustment screw 18 and the inner element 17, the expanding element 16 has an axially continuous slot 44 at which the expanding element 16 can be radially opened and moved over the inner element 17 and the adjustment screw 18.

In the case of the movement for clamping the inner tube in the outer tube 12 by means of the expanding device 15, as a result of rotating the inner tube 11 to the right (in the case of left-handed thread) or to the left (in the case of right-handed thread) and consequently the adjustment screw 18 in relation to the outer tube 12, the inner element 17 is moved away from the inner tube 11, the expanding element 16 being moved or pressed first of all in the same direction as far as up to the outer stop 26. When the inner element 17 is moved further axially, the expanding element 16 is then expanded in the radial direction such that the outer circumference of the expanding element 16 abuts under pressure against the inner circumference of the outer tube 12. In said state, the expanding element 16 is at a certain predefined small spacing from the inner stop surface 30. If, then, with the inner tube 11 clamped in the outer tube 12 at more or less high torque, there is an impact-like axial load proceeding from the outer tube 12 which is provided with, for example, a handle toward the inner tube 11 which is provided with a pole tip, on account of the expanding element 16 being clampingly fixed in the outer tube 12, the inner element 17 is able to move in an axial manner. This means that the inner element 17 moves further into the inner cone 27 of the expanding element 16, which leads to further expanding of the expanding element 16 and consequently to an increase in the holding force between the inner tube 11 and the outer tube 12.

If such a mechanism is then fully triggered, it can occur that in the actual clamping region 36, if the inner element has been screwed a sufficient amount with respect to the inner tube, absolutely no contact surface or only a small contact surface to the inner surface of the outside tube is made available. If, then, an attempt is made to secure the mechanism as a result of rotating the inner tube relative to the outer tube, the expanding element is entrained in rotation because it is able to slip along the inner surface of the outer tube so easily. The mechanism can then no longer be secured, but this can be prevented in an effective manner as a result of the above-described clamping portions 1 and of the above-described method of operation thereof. A problem connected therewith is produced if the inner element is rotated too far with respect to the inner tube, or rather with respect to the stop surface 30 that is arranged there. As the inner element has a cylindrical portion 20, it is then possible that the surface 24, which faces the stop surface 30, comes into wide-area contact with said stop surface. The friction occurring in this case can then prevent the mechanism from being able to be secured again. In reality, the inner tube 11 and the adjustment screw 18 must definitely rotate together and the inner element 17 and the expanding element 16 should remain non-rotatable in the same position of rotation and relative to the outer tube. If the inner element is then rotated too strongly when abutting against the stop surface 30 over a wide area, the clamping portions 1 on the expanding element 16 can also no longer provide friction in a sufficient manner, which leads to the case where, when the inner tube 11 is rotated, the entire mechanism including the inner element and the expanding element can still be rotated and cannot be fixed. This can be prevented, as can be seen in particular by way of FIG. 5, by a projection 25 being arranged on the stop surface 24 on the inner element. This prevents the stop surface 24 moving into wide-area contact with the stop surface 30 on the end plug, as a result of which such overly strong fixing between the inner element and the end plug is able to be prevented. As an alternative to this or in addition to it, it is possible to arrange on the surface 30 of the end plug 19 a projection 28 which essentially assumes the same function.

It is quite especially advantageous then when a projection 25 is arranged on the inner element in the form of a ramp which builds up and terminates in an axial closure face 34, and by a ramp 28 with an axial portion 35 also being provided on the end plug 19 in a manner corresponding thereto. Said two ramps 25 and 28, in this case, are arranged in a relative manner with reference to their inclination and also with reference to their height such that, as can be seen in particular in the perspective view according to FIG. 6 c), they can move into wide-area abutment in the direction of rotation. Thus, there can be absolutely no more contact with the surface 30 and consequently also no friction, which counteracts the mechanism being fixed, can be built up between the end plug and the inner element. So that there can be as advantageous an arrangement of the ramps 28 as possible at the end plug, in an advantageous manner a tapered region 29 is realized on the adjustment screw in the region adjoining the end plug 19 such that the ramps 28 are able to be realized as wide as possible, and that when the adjustment screw is installed there is a certain tolerance.

LIST OF REFERENCES

1 Elastic clamping portion
2 Contact surface of 1
3 Axial limiting slot in 38 for 1
4 Arm of 1
10 Length-adjustable tube
11 Inner tube
12 Outer tube
13 End of the inner tube facing the outer tube
14 Tube sleeve
15 Expanding device
16 Expanding sleeve, expanding element
17 Inner element, clamping wedge
18 Rod with externally threaded portion, externally threaded rod, adjustment screw
19 End plug
20 Cylindrical portion of the clamping wedge
21 Axial threaded bore of clamping wedge
22 Outer cone of clamping wedge
23 Expandable main body of the expanding sleeve
24 Bottom stop surface on the clamping wedge
25 Ramp on the bottom stop surface of the clamping wedge, wedge
26 Outer stop, screw head
27 Inner cone of the expanding sleeve
28 Ramp on the collar of the end plug
29 Tapered region of the adjustment screw
30 Top face of the collar of the end plug, bottom stop for expanding sleeve
31 Portion of the end plug located in the inner tube
32 Circumferential flange
34 Axial stop surface of the ramp on the clamping wedge
35 Axial stop surface of the ramp on the collar
36 Expanding region of 16
37 Thread-free passage opening through expanding sleeve
38 Cylindrical shoulder of the expanding sleeve
39 Axial indentation in outer surface of the expanding sleeve
40 Axial rib on outer surface on surface of the expanding sleeve
41 Wing
42 Wing in continuous slot
43 Slot
44 Continuous slot
45 Bottom of slot 43
A Axis of 16
$r_1$ Outer radius of outer surface in expanding region of 16
$r_2$ Outer radius of elastic clamping portion

The invention claimed is:

1. A length-adjustable tube, for sticks including ski poles, trekking poles, cross-country poles and Nordic walking poles, said length-adjustable tube
    having at least one outer tube and one inner tube which is telescopically insertable into the outer tube for adjusting the tube length, and
    having an expanding device which is held at the insertion end of the inner tube and by way of which the inner tube is axially clampable in the outer tube and which comprises an expanding element, which can be pushed apart radially and is provided with a female cone,
    an inner element, which is provided with an opposing male cone and is configured for interaction with the female cone in an axially displaceable manner in the expanding element, and
    an axially directed adjustment screw which is held non-rotatably on the inner tube and is in operative connection with an internally threaded bore in the inner element,
    wherein the expanding element has a thread-free passage opening through which the adjustment screw passes,
    wherein a clamping portion is arranged on or in the expanding element, which clamping portion, in the radial direction, at least in the region of a contact surface, has a greater radius in the relaxed state than the radius of the expanding element in its expanding region which is brought about as a result of the interaction with the inner element,
    wherein the clamping portion is offsettable or displaceable inward at least in the region of the contact surface in an elastic manner against a resetting force toward a central axis at least as far as up to the radius of the expanding element,
    wherein in its axial region which faces the inner tube, the expanding element has a cylindrical portion which is only expanded a little or is substantially not expanded by the inner element, and wherein the clamping portion is arranged in said cylindrical portion, and
    wherein the clamping portion is developed in the form of at least one elastic tongue which is realized by two axially extending slots separate from the cylindrical portion and which is connected at least on one side to the cylindrical portion by means of an arm which acts as an elastic link to the cylindrical portion.

2. The length-adjustable tube as claimed in claim 1, wherein the elastic tongue comprises a free end which faces the inner tube.

3. The length-adjustable tube as claimed in claim 1, wherein at least two elastic tongues are arranged on the cylindrical portion of the expanding element, in an oppositely situated manner or rather in the case of more than two in a manner distributed equally around the circumference.

4. The length-adjustable tube as claimed in claim 1, wherein the greater radius of the clamping portion is at least 1% greater than the radius of the expanding element in the relaxed state.

5. The length-adjustable tube as claimed in claim 1, wherein the clamping portion is realized integrally with the expanding element.

6. The length-adjustable tube as claimed in claim 1, wherein a projection, which extends in each case in the axial direction, is arranged on a stop surface of the inner tube which faces the expanding device or on the inner element on its stop surface which faces the inner tube.

7. The length-adjustable tube as claimed in claim 6, wherein the projection is realized in the form of a ramp, which is built up gradually in the circumferential direction and ends in an axial stop surface, and which comprises an axial height within the range of 0.1-3 mm.

8. The length-adjustable tube as claimed in claim 7, wherein such projections are arranged on both the inner tube and the inner element, and wherein they are realized working in opposite directions in such a manner that the two axial stop surfaces, when turning down the inner element with respect to the inner tube, can be moved into a wide-area abutment position.

9. The length-adjustable tube as claimed in claim 6, wherein the projection is realized in the form of a ramp, which is built up gradually in the circumferential direction and ends in an axial stop surface, and which comprises an axial height within the range of 0.2-1 mm.

10. The length-adjustable tube as claimed in claim 1, wherein the female cone of the expanding element extends in such a manner that it opens toward the inner tube, and wherein the expanding element is held so as to be movable axially within certain limits between an inner stop on the inner tube and an outer stop.

11. The length-adjustable tube as claimed in claim 1, wherein the expanding element is realized in a cup-shape manner and a cup bottom is penetrated by a free end region of the adjustment screw, which is remote from the inner tube, through the thread-free passage opening.

12. The length-adjustable tube as claimed in claim 1, wherein the expanding element is provided in a circumferential region with a slot which extends over an entire axial length.

13. The length-adjustable tube as claimed in claim 1, wherein the expanding device comprises a plug, which receives the adjustment screw in an axial and non-rotatable manner, is held in the inner tube in an axial and non-rotatable manner and which forms the inner stop.

14. The length-adjustable tube as claimed in claim 1, wherein the cylindrical portion has a smaller outer diameter than the expanding region of the expanding element which is arranged on the side facing the outer tube, in which the expanding element is expanded by the inner element.

15. The length-adjustable tube as claimed in claim 1, wherein the tab comprises a free end which faces the inner tube, and in said region provides a conically extending contact surface which is directed radially outward and is adapted to the inside surface of the outer tube.

16. The length-adjustable tube as claimed in claim 1, wherein the greater radius of the clamping portion within the range of 3-8% greater than the radius of the expanding element in the relaxed state.

17. The length-adjustable tube as claimed in claim 1, wherein the female cone of the expanding element extends in such a manner that it opens toward the inner tube, and wherein the expanding element is held so as to be movable axially within certain limits between an inner stop on the inner tube and an outer stop, on the free end of the adjustment screw.

18. The length-adjustable tube as claimed in claim 1, wherein the female cone of the expanding element extends in such a manner that it opens toward the inner tube, and wherein the expanding element is held so as to be movable axially within certain limits between an inner stop on the inner tube and an outer stop, wherein said axial play is within the range of 0.1-5 mm.

19. The length-adjustable tube as claimed in claim 1, wherein the female cone of the expanding element extends in such a manner that it opens toward the inner tube, and wherein the expanding element is held so as to be movable axially within certain limits between an inner stop on the inner tube and an outer stop, wherein said axial play is within the range of 0.25-2.5 mm.

20. The length-adjustable tube as claimed in claim 1, wherein the expanding element is realized in a cup-shape manner and a cup bottom is penetrated by a free end region of the adjustment screw, which is remote from the inner tube, through the thread-free passage opening, wherein the outer stop is formed by a cap which is placed onto the free end of the adjustment screw once the expanding element has been placed in position and is fastened axially or by a screw head which is arranged there.

21. The length-adjustable tube as claimed in claim 1, wherein the expanding element is provided in a circumferential region with a slot which extends over the entire axial length, as well as, in addition, with a slot which is located on the opposite circumference and extends substantially up to a cylindrical portion of the expanding element which faces the inner tube and extends through said expanding element, wherein in a the inner element which is provided with the male cone comprises one or more radial wings which is or are guided in axial slots of the expanding element.

22. The length-adjustable tube as claimed in claim 1, wherein the expanding device comprises a plug, which receives the adjustment screw in an axial and non-rotatable manner, is held in the inner tube in an axial and non-rotatable manner, up to a circumferential flange, and which forms the inner stop.

23. A ski pole, trekking pole, cross-country pole or Nordic walking pole having a length-adjustable tube as claimed in claim 1.

24. A ski pole, trekking pole, cross-country pole or Nordic walking pole according to claim 23, with more than only one adjustment range, and further adjustment ranges being realized either with said expanding device or with another expanding device which, can also be located outside, and wherein a handle is arranged on the topmost outer tube and a pole tip on the bottommost inner tube.

* * * * *